United States Patent
Shoge

(10) Patent No.: US 6,607,465 B1
(45) Date of Patent: Aug. 19, 2003

(54) BICYCLE HUB TRANSMISSION WITH A GUIDING MEMBER FOR A SUN GEAR

(75) Inventor: Akihiko Shoge, Shimonoseki (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/522,703

(22) Filed: Mar. 10, 2000

(51) Int. Cl.⁷ ............................. F16H 3/44; F16H 55/12
(52) U.S. Cl. ......................................... 475/297; 74/439
(58) Field of Search .................................. 475/288, 289, 475/296, 297, 298, 275, 281, 314, 324; 74/439, 446, 449; 384/906, 295; 192/46, 69.11

(56) References Cited

U.S. PATENT DOCUMENTS

| | | | | |
|---|---|---|---|---|
| 2,189,220 A | * | 2/1940 | Osborne ...................... 74/260 |
| 2,646,691 A | * | 7/1953 | Heisler ..................... 192/69.91 |
| 3,799,004 A | * | 3/1974 | Hause ......................... 74/763 |
| 3,934,492 A | * | 1/1976 | Timbs ........................ 475/210 |
| 4,649,771 A | * | 3/1987 | Atkinson et al. ......... 74/781 R |
| 4,671,678 A | * | 6/1987 | Munch ................... 384/297 X |
| 4,706,520 A | * | 11/1987 | Sivalingam ............... 74/781 R |
| 4,721,013 A | * | 1/1988 | Steuer et al. ............... 475/289 |
| 4,907,464 A | * | 3/1990 | Isozumi ....................... 74/7 A |
| 5,013,166 A | * | 5/1991 | Domer ................... 384/295 X |
| 5,055,098 A | * | 10/1991 | Umebayashi et al. ....... 475/312 |
| 5,078,664 A | | 1/1992 | Nagano ...................... 475/297 |
| 5,081,875 A | * | 1/1992 | Isozumi et al. .............. 74/7 R |
| 5,397,282 A | * | 3/1995 | Weidman .................... 475/205 |
| 5,399,128 A | * | 3/1995 | Nurnberger ................. 475/298 |
| 5,411,447 A | * | 5/1995 | Frost ........................... 475/223 |
| 5,443,130 A | * | 8/1995 | Tanaka et al. .......... 475/174 X |
| 5,540,456 A | * | 7/1996 | Meier-Burkamp et al. .. 475/271 X |
| 5,562,563 A | | 10/1996 | Shoge ......................... 475/298 |
| 5,706,699 A | * | 1/1998 | Moribayashi ................ 74/7 A |
| 5,785,625 A | * | 7/1998 | Matsuo et al. .............. 475/298 |
| 5,855,530 A | | 1/1999 | Huang et al. ................ 475/289 |
| 5,863,270 A | | 1/1999 | Chen et al. .................. 475/289 |
| 5,927,149 A | * | 7/1999 | Moody .................. 74/594.1 X |
| 5,947,245 A | * | 9/1999 | Costin et al. ................. 192/46 |
| 5,961,416 A | * | 10/1999 | Shoge ......................... 475/297 |
| 5,967,937 A | | 10/1999 | Matsuo ....................... 475/297 |
| 6,048,287 A | * | 4/2000 | Rohloff ....................... 475/297 |
| 6,053,060 A | * | 4/2000 | Tumberlinson et al. ... 74/446 X |
| 6,387,008 B1 | * | 5/2002 | Chen et al. .................. 475/296 |

FOREIGN PATENT DOCUMENTS

| | | | | |
|---|---|---|---|---|
| EP | 549570 | * | 6/1993 | ................. 475/298 |
| FR | 116917 | * | 6/1918 | ................. 475/296 |
| WO | 98/52817 | | 11/1998 | |
| WO | 98/52818 | | 11/1998 | |

* cited by examiner

Primary Examiner—Charles A. Marmor
Assistant Examiner—Roger Pang
(74) Attorney, Agent, or Firm—James A. Deland

(57) ABSTRACT

A sun gear apparatus includes an axle, a sun gear rotatably supported around the axle, and a sun gear guide ring disposed between an inner peripheral surface of the sun gear and the axle. The sun gear guide ring minimizes or eliminates looseness in the coupling between the sun gear and the axle.

38 Claims, 15 Drawing Sheets

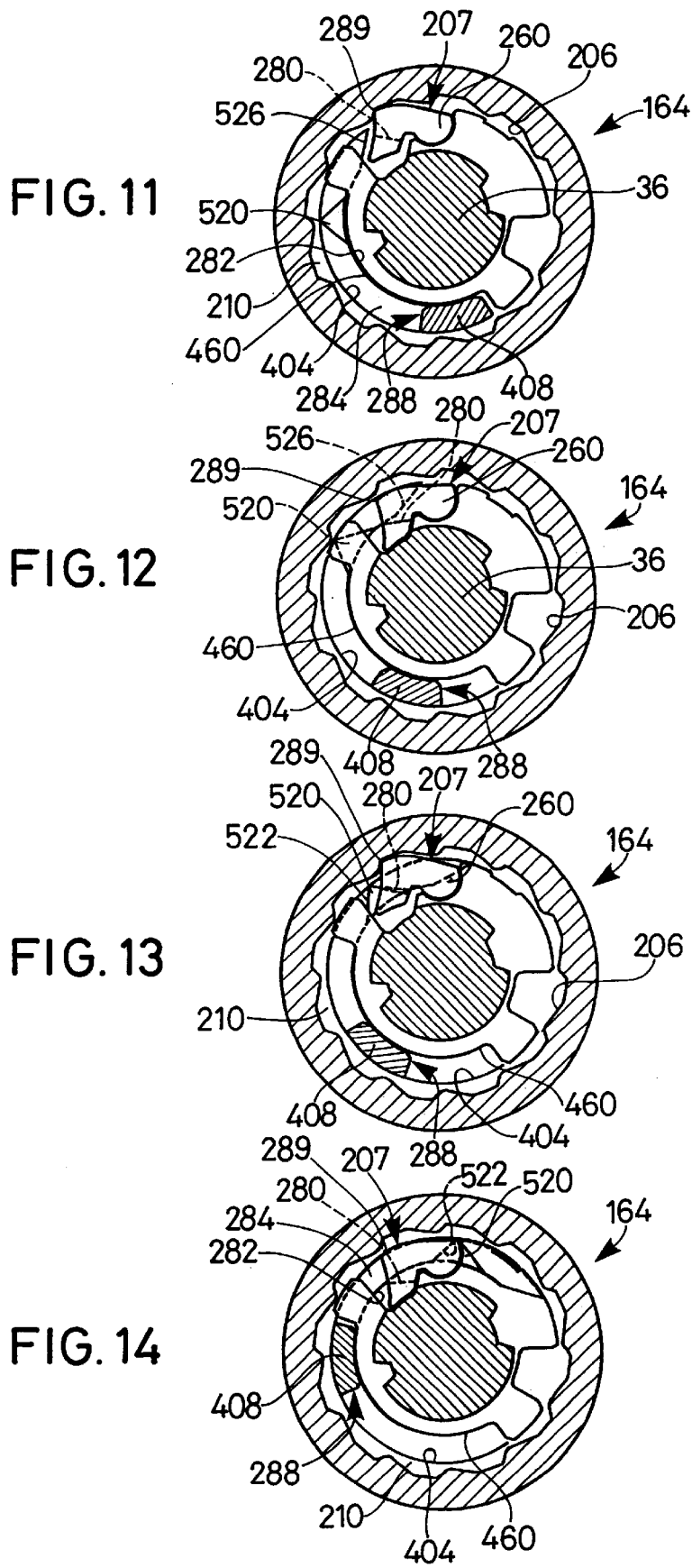

BICYCLE HUB TRANSMISSION WITH A GUIDING MEMBER FOR A SUN GEAR

BACKGROUND OF THE INVENTION

The present invention is directed to bicycle transmissions and, more particularly, to an internally mounted multi-speed hub transmission for a bicycle.

An internally-mounted multi-speed hub transmission sometimes is mounted to the rear wheel of a bicycle so that the rider can select different gear ratios to vary the pedaling effort. A typical hub transmission includes a hub axle that is mounted to the bicycle frame, a driver rotatably supported to the hub axle for receiving the pedaling force through a sprocket and chain, and a hub shell rotatably supported to the hub axle. A power transmitting mechanism is disposed between the driver and the hub shell for communicating rotational power from the driver to the hub shell through a plurality of power transmission paths, wherein each power transmission path typically produces a unique gear ratio. The power transmitting mechanism ordinarily comprises a planetary gear mechanism including one or more sun gears rotatably supported around the hub axle, a ring gear rotatably supported around the hub axle, a planet gear carrier rotatably supported around the hub axle, and a plurality of planet gears rotatably supported to the planet gear carrier and meshing with the sun gear and the ring gear. The plurality of power transmission paths and the corresponding gear ratios are selected by selectively nonrotatably coupling the various components to each other. For example, one gear ratio may be selected by nonrotatably coupling a sun gear to the hub axle, another gear ratio may be selected by nonrotatably coupling the driver relative to the planet gear carrier, and another gear ratio may be selected by nonrotatably coupling the driver relative to the ring gear. Many such coupling relationships often are possible in a typical hub transmission, thus resulting in a relatively large number of possible gear ratios.

When a gear ratio is selected by nonrotatably coupling the sun gear to the axle, the coupling may be accomplished by a ratchet and pawl mechanism disposed between an inner peripheral surface of the sun gear and the hub axle. More specifically, a plurality of pawls may be mounted to the inner peripheral surface of the sun gear such that an end of each pawl is biased radially inwardly by a spring. The outer peripheral surface of the hub axle typically forms a plurality of ratchet teeth or abutments which engage the ends of the pawls to nonrotatably couple the sun gear to the hub axle, and a control sleeve is rotatably supported to the hub axle to selectively expose the abutments. As a result, the sun gear is free to rotate relative to the hub axle when the abutments are covered by the control sleeve, and the sun gear is nonrotatably coupled to the hub axle when the abutments are exposed.

The sun gears usually are supported to the hub axle through the plurality of pawls. As a result, often there is some looseness in the support of the sun gear on the hub axle which decreases the precision of the ratchet and pawl mechanism. Such looseness can be compensated for by increasing the number of pawls, but that increases the cost and complexity of the transmission, not to mention the risk of malfunction. Additionally, the circumferential distance between successive ratchet teeth or abutments on the hub axle ordinarily is relatively large. As a result, the sun gear ordinarily must rotate a substantial distance before the pawls engage the ratchet teeth or abutments. This causes undesirable delay in the gear switching operation.

Another type of hub transmission includes a sun gear rotatably mounted around the axle, wherein an inner peripheral surface of the sun gear defines a plurality of ratchet teeth. One or more pawls may be disposed in an aperture formed in a hollow axle to selectively engage the plurality of ratchet teeth. However, a hollow axle is not very strong and is not suitable for severe operating conditions. Yet another type of hub transmission also uses pawls mounted to the axle, but the pawls are operated by a control sleeve that directly supports the sun gears. Such a configuration causes excessive friction on the control sleeve.

Another disadvantage of conventional hub transmissions is that, when switching from one gear ratio to another gear ratio, the transmission sometimes must pass temporarily through another gear ratio that is not near the destination gear ratio as the various components change their coupling relationships. This phenomenon is discussed more fully in the detailed description below. For example, when shifting from a small gear ratio, wherein the hub shell rotates around the axle at a relatively slow rate relative to the driver, to a higher gear ratio, wherein the hub shell rotates around the axle at a larger rate relative to the driver (such as occurs when the bicycle is decelerating), the transmission may temporarily switch into a gear ratio that is lower than the original gear ratio. This causes the pedals to speed up temporarily, which is opposite the desired effect and can be very disconcerting to the rider.

Another disadvantage of conventional hub transmissions is that the sun gear ratchet and pawl mechanisms ordinarily are controlled by a relatively thin sleeve that is rotatably supported on the hub axle. As noted above, such a sleeve often is used to selectively expose the abutments on the hub axle for engaging the pawls on the sun gears. The sleeve typically is relatively long and is operated from outside the hub shell, thus creating significant torsional stresses on the sleeve. Such forces create a risk of bending or twisting the sleeve.

Another disadvantage of conventional hub transmissions is that the sleeve that controls the ratchet and pawl mechanisms (and any other desired coupling mechanisms) is sometimes coupled to an external actuating member such as an actuating ring through one or more return springs that bias the actuating ring to a start position. Such a biasing force is used not only to provide proper tensioning of the components during the switching operations but also to help control a shift assist function. Such a shift assist function uses the force of the rotating driver to help overcome resistance to the shift operation such as occurs when significant pedaling force is applied to the hub. More specifically, a coupling mechanism that is normally biased to an inoperative state is activated to couple the sleeve to the driver so that the force from the driver overcomes the excessive resistance. In any event, when such a biased actuating ring is operated by a battery-operated motor, the motor must overcome the biasing force of the return spring. This typically requires a relatively large motor that consumes a substantial amount of power, thus significantly reducing battery life.

SUMMARY OF THE INVENTION

The present invention is directed to a bicycle hub transmission wherein the sun gears are stably supported on the hub axle, wherein the gear switching operation is performed with precision and minimal delay and with minimal effect on the rider, wherein components such as the control sleeve used to control a ratchet and pawl mechanism is stably supported to minimize the risk of bending or other damage, and wherein the actuating member used for the gear switching operation does not cause excessive power consumption when driven by a battery-operated motor.

In one embodiment of the present invention directed to a basic sun gear apparatus, the sun gear apparatus includes an axle, a sun gear rotatably supported around the axle, and a sun gear guide ring disposed between an inner peripheral surface of the sun gear and the axle. The sun gear guide ring minimizes or eliminates looseness in the coupling between the sun gear and the axle. One or more such guide rings may be used to support a single sun gear, or one guide ring may be used to support multiple sun gears.

In a more specific embodiment of the present invention wherein a pawl is disposed between an inner peripheral surface of the sun gear and the axle for moving between an engaged position (wherein the sun gear is nonrotatably coupled to the axle) and a disengaged position (wherein the sun gear rotates relative to the axle), a pawl is retained to the axle such that an end of the pawl is biased radially outwardly to engage one of a plurality of ratchet teeth on the sun gear. To minimize the delay when switching the sun gear from the engaged state to the disengaged state, only one such pawl is provided, an the sun gear includes more than ten ratchet teeth (e.g., twelve) to ensure quick engagement between the pawl and one of the ratchet teeth. If the apparatus is used in a hub transmission of the type having a driver and a hub shell rotatably supported to the hub axle, wherein the sun gear mechanism is part of a planetary gear mechanism of the type described above, a roller clutch may be disposed between the ring gear and the hub shell to further reduce the delay when switching from one gear ratio to another gear ratio.

In another more specific embodiment of the present invention, a pawl control member may be provided for moving the pawl between the engaged position and the disengaged position. If the pawl control member is an elongated member disposed between the sun gear guide ring and the axle, then the sun gear guide ring not only stably supports the sun gear on the axle but also provides reinforcement to the pawl control member to minimize or eliminate the risk of bending or other damage to the pawl control member.

In another feature of the present invention directed to how the transmission is shifted from one gear to another gear, a clutch is provided for selecting the plurality of power transmission paths such that, when the clutch changes the power transmitting mechanism from a first intermediate speed transmission path having a first intermediate gear ratio to a second intermediate speed transmission path having a second intermediate gear ratio lower than the first intermediate gear ratio and adjacent to the first intermediate gear ratio, the clutch switches the power transmitting mechanism from the first intermediate speed transmission path to a third intermediate speed transmission path having a third intermediate gear ratio higher than the first intermediate gear ratio and less than a high speed gear ratio before switching the power transmitting mechanism to the second intermediate speed transmission path. Conversely, the clutch may be provided such that, when the clutch changes the power transmitting mechanism from a first intermediate speed transmission path having a first intermediate gear ratio to a second intermediate speed transmission path having a second intermediate gear ratio higher than the first intermediate gear ratio and adjacent to the first intermediate gear ratio, the clutch switches the power transmitting mechanism from the first intermediate speed transmission path to a third intermediate speed transmission path having a third intermediate gear ratio lower than the first intermediate gear ratio and higher than the low speed gear ratio before switching the power transmitting mechanism to the second intermediate speed transmission path.

In another feature of the present invention, an unbiased actuating member is used to operate the clutch while still providing the shift assist function noted above. More specifically, the axle defines an axle axis; a first rotating member is rotatably supported around the axle axis, wherein the first rotating member includes a location for coupling to a shift control mechanism; a second rotating member is rotatably supported around the axle axis; and a first spring is coupled between the first rotating member and the second rotating member for biasing the first rotating member and the second rotating member in a predetermined rotational direction relative to each other. A pawl support rotating member is rotatably supported around the axle axis, wherein the second rotating member is disposed between the first rotating member and the pawl support rotating member; a pawl is rotatably supported to the pawl support rotating member; a biasing mechanism biases the pawl in a radial direction; a first coupling member couples the first rotating member to the pawl support rotating member; and a pawl control rotating member controls a radial position of the pawl. An actuating member is rotatably supported around the axle axis for rotating the first rotating member; and a second coupling member couples the second rotating member, the pawl control rotating member and the actuating member for rotating the pawl control rotating member relative to the pawl support rotating member. This structure provides the shift assist function while providing no net bias to the actuating member.

BRIEF DESCRIPTION OF THE DRAWINGS

FIG. 11 is a view taken along line XI—XI in FIG. 2 showing the shift control sleeve in a first position;

FIG. 12 is a view taken along line XI—XI in FIG. 2 showing the shift control sleeve in a second position;

FIG. 13 is a view taken along line XI—XI in FIG. 2 showing the shift control sleeve in a third position;

FIG. 14 is a view taken along line XI—XI in FIG. 2 showing the shift control sleeve in a fourth position;

FIG. 24 is a schematic view illustrating the biasing of the shift/assist mechanism.

DETAILED DESCRIPTION OF THE EMBODIMENTS

Figure 1:
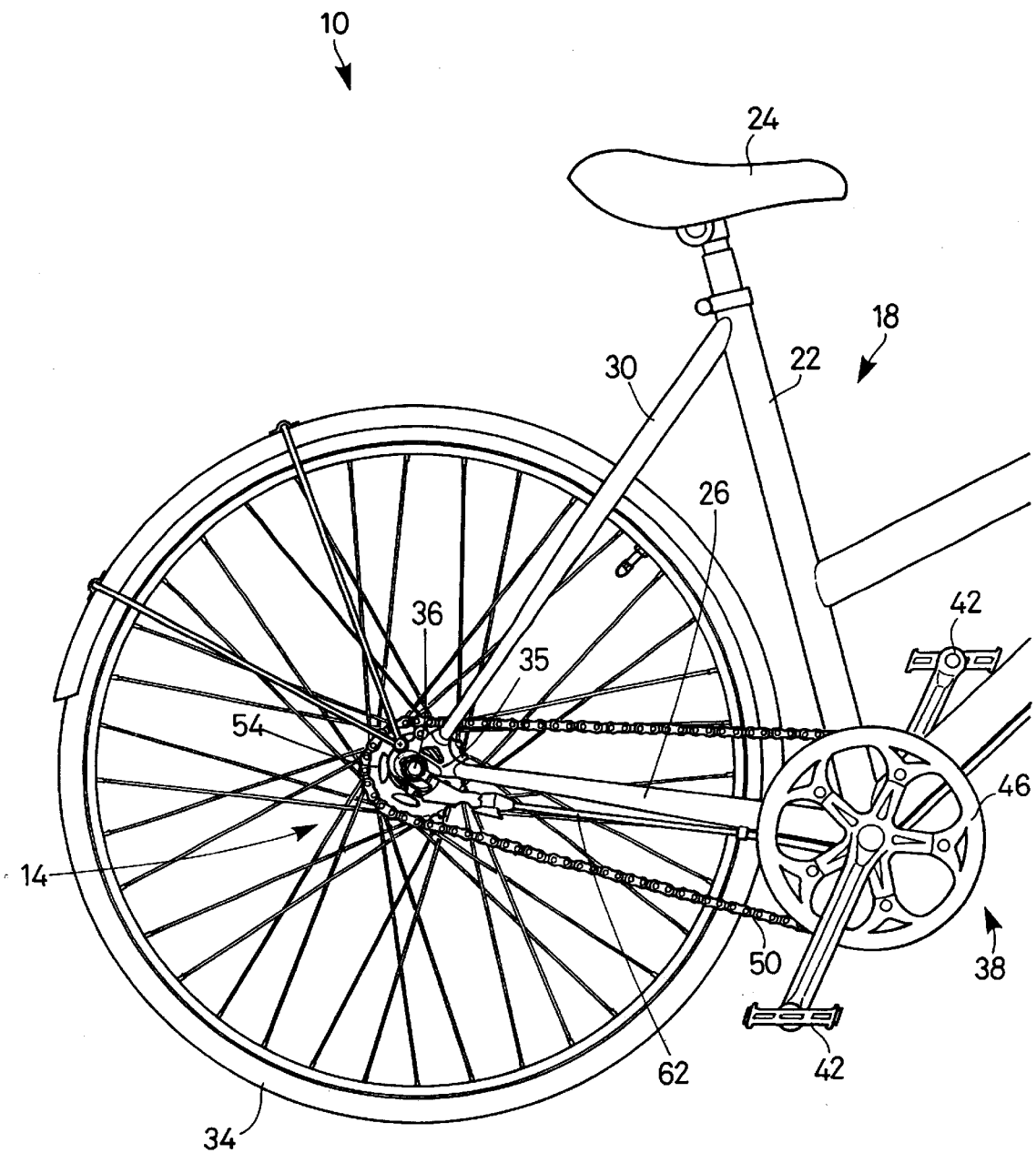
FIG. 1 is a side view of a rear of a bicycle that includes a hub transmission that incorporates many features of the present invention.

FIG. 1 is a side view of a rear of a bicycle 10 that includes a particular embodiment of a hub transmission 14 that incorporates many features of the present invention. The rear portion of bicycle 10 includes a frame 18 with a seat tube 22 supporting a saddle 24, a pair of conventional chain stays 26, and a pair of conventional seat stays 30. A wheel 34 is rotatably supported by a frame end 35 around an axle 36 of hub transmission 14 at the intersection of chain stays 26 and seat stays 30, and a crank assembly 38 having pedals 42 and a chain ring 46 is rotatably supported at the intersection of seat tube 22 and chain stays 26. A chain 50 10 engages chain ring 46 and wraps around a sprocket 54 that rotatably drives hub transmission 14. A Bowden-type control cable 62 is used to change gear ratios in hub transmission 14 in a manner described more fully below.

Figure 2:
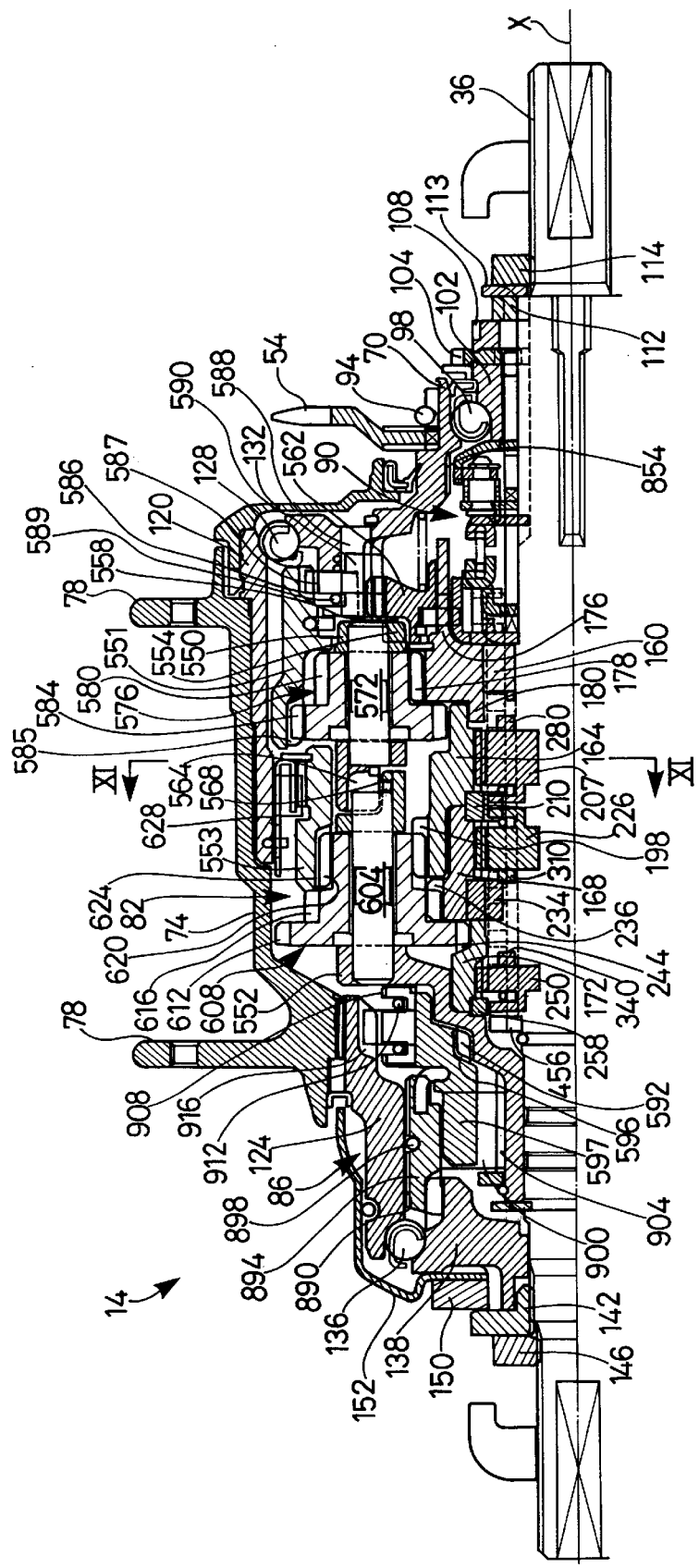
FIG. 2 is cross sectional view of a particular embodiment of a hub transmission according to the present invention.

FIG. 2 is cross sectional view of a particular embodiment of hub transmission 14. As shown in FIG. 2, hub transmission 14 includes axle 36, a driver 70 rotatably supported to axle 36, a hub shell 74 including spoke flanges 78 rotatably supported to axle 36, a power transmitting mechanism 82 disposed between driver 70 and hub shell 74 for communicating rotational power from driver 70 to hub shell 74 through a plurality of power transmission paths, a coaster brake 86 for stopping the rotation of hub shell 74 relative to axle 36, and a shift/assist mechanism 90 for controlling the selection of the plurality of power transmission paths and for using the rotational power of driver 70 to help change the power transmission paths in power transmitting mechanism 82.

Sprocket 54 is coupled to driver 70 in a splined manner using a snap ring 94, and driver 70 is rotatably supported on axle 36 through ball bearings 98 and a bearing cone 102. Bearing cone 102 is maintained in place by an actuator plate 104, a spacer 108, a washer 112, a nonrotatable lock washer 113 and a lock nut 114.

A right cup 120 is nonrotatably fitted at the right side inner peripheral surface of hub shell 74, and a left cup 124 is nonrotatably fitted at the left side inner peripheral surface of hub shell 74. Right cup 120 rotatably supports hub shell 74 to driver 70 through ball bearings 128, and the internal components at the right side of hub transmission 14 are protected from external contaminants by a sealing cup 132 fitted over right cup 120. Left cup 124 rotatably supports hub shell 74 on axle 36 through ball bearings 136 and a brake cone 138. Brake cone 138 is maintained on axle 36 by a stop nut 142 and a lock nut 146. A brake arm 150 is nonrotatably coupled to brake cone 138 and is fastened to chain stay 26 in a well known manner. The internal components at the left side of hub transmission 14 are protected from external contaminants by a sealing cup 152.

As shown in FIGS. 2–6, power transmitting mechanism 82 includes a first sun gear 160, a separate second sun gear 164, a separate third sun gear 168, and a separate fourth sun gear 172. First sun gear 160 is nonrotatably supported to axle 36, and it includes a clutch cam portion 176, a plurality of first sun gear teeth 178 (e.g., 48T) formed on an outer peripheral surface thereof, and an outer peripheral second sun gear contact surface 180. Second sun gear 164 is rotatably supported around axle 36 adjacent to first sun gear 160, and, as shown more clearly in FIG. 3, it includes an inner peripheral first sun gear contact surface 192 for slidably contacting second sun gear contact surface 180 on first sun gear 160, a plurality of second sun gear ratchet teeth 206 (e.g., 12T) formed on an inner peripheral surface thereof for engaging a second sun gear pawl 207, an inner peripheral guide ring contact surface 208 for slidably contacting an outer peripheral surface 209 of a sun gear guide ring 210, an inner peripheral third sun gear contact surface 200, and a plurality of second sun gear teeth 198 (e.g., 48T) formed on an outer peripheral surface thereof. Third sun gear 168 is rotatably supported around axle 36 adjacent to second sun gear 164, and it includes an inner peripheral first guide ring contact surface 220 for slidably contacting the outer peripheral surface 209 of sun gear guide ring 210, a plurality of third sun gear ratchet teeth 224 (e.g., 12T) formed on an inner peripheral surface thereof for engaging a third sun gear pawl 226, an inner peripheral second guide ring contact surface 228 for contacting an outer peripheral surface 232 of a sun gear guide ring 234, an outer peripheral second sun gear contact surface 235 for slidably contacting third sun gear contact surface 200 on second sun gear 164, and a plurality of third sun gear teeth 236 (e.g., 42T) formed on an outer peripheral surface thereof. Fourth sun gear 172 includes a plurality of fourth sun gear teeth 244 (e.g., 36T) formed on an outer peripheral surface thereof, a plurality of fourth sun gear ratchet teeth 248 (e.g., 12T) formed on an inner peripheral surface thereof for engaging a fourth sun gear pawl 250, and an inner peripheral guide ring contact surface 252 for slidably contacting the outer peripheral surface 254 of a guide ring 258.

Pawl 207 includes a pawl seat 260 that is pivotably seated in a pawl receiving groove 264 formed in axle 36, a spring receiving groove 268 for receiving a spring 272 mounted in a spring receiving groove 276 formed in axle 36, a pawl control surface 280 for contacting an inner peripheral surface 282 of a pawl control arm 284 of a pawl control sleeve 288, and a pawl tooth 289 for engaging second sun gear ratchet teeth 206. Similarly, pawl 226 includes a pawl seat 290 that is pivotably seated in a pawl receiving groove 294 formed in axle 36, a spring receiving groove 298 for receiving a spring 302 mounted in a spring receiving groove 306 formed in axle 36, a pawl control surface 310 (FIG. 2)for contacting an inner peripheral a surface 312 of a pawl control arm 314 of pawl control sleeve 288, and a pawl tooth 316 for engaging third sun gear ratchet teeth 224. Finally, pawl 250 includes a pawl seat 320 that is pivotably seated in a pawl receiving groove 324 formed in axle 36, a spring receiving groove 328 for receiving a spring 332 mounted in a spring receiving groove 336 formed in axle 36, a pawl control surface 340 (FIG. 2) for contacting an inner peripheral surface 342 of a pawl control arm 344 of pawl control sleeve 288, and a pawl tooth 346 for engaging fourth sun gear ratchet teeth 248. Pawl teeth 289, 316 and 346 of pawls 207, 226 and 250 are biased radially outwardly by their respective springs 272, 302 and 332 in a well known manner.

Figure 3:
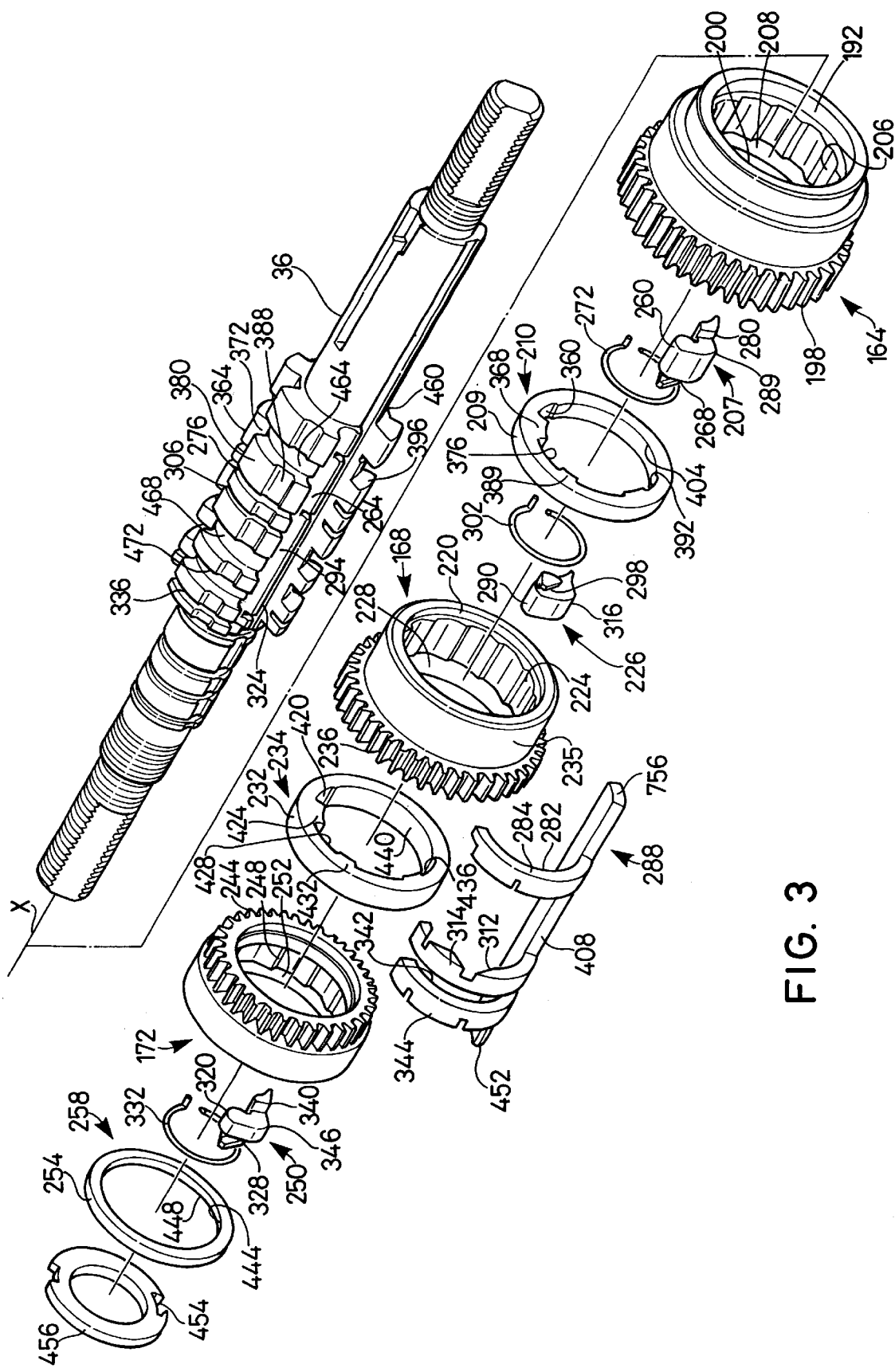
FIG. 3 is an exploded view of an axle and sun gear apparatus used in the hub transmission.
Figure 4:
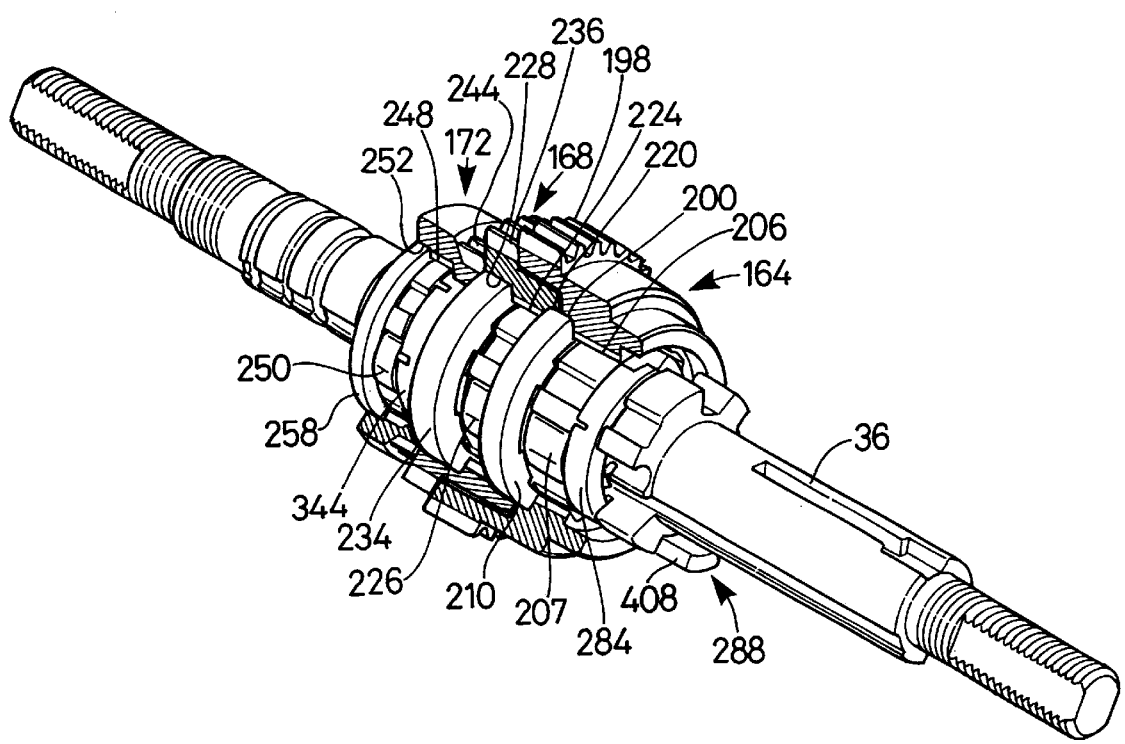
FIG. 4 is an assembled view of the axle and sun gear apparatus.
Figure 5:
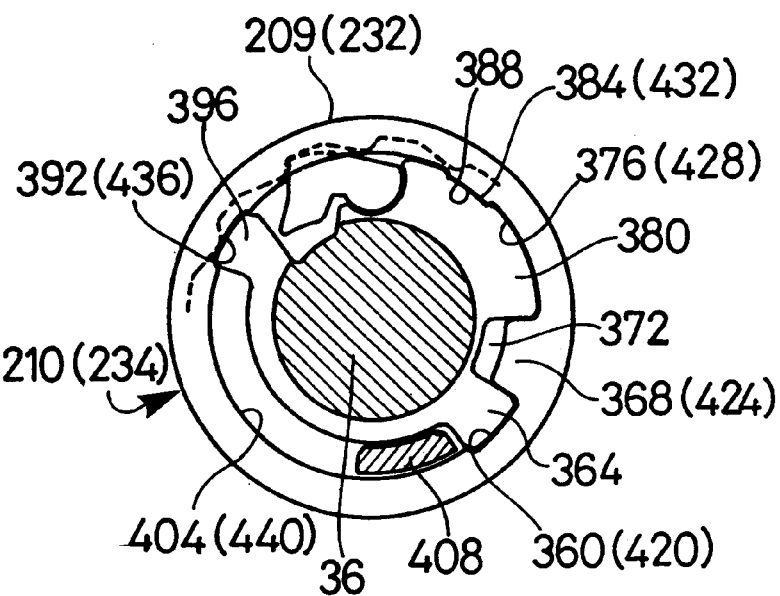
FIG. 5 is a side view showing how a sun gear guide ring used for either the second or third sun gear is fitted on the axle.

In this embodiment, half of sun gear guide ring 210 is fitted between guide ring contact surface 208 of second sun gear 164 and axle 36, and the other half of sun gear guide ring 210 is fitted between first guide ring contact surface 220 of third sun gear 168 and axle 36. As shown in FIGS. 3 and 5, in addition to outer peripheral surface 209, sun gear guide ring 210 includes a locking recess 360 for engaging a locking ridge 364 formed intermittently in the direction of axis X on axle 36, a locking projection 368 for engaging a locking groove 372 formed intermittently in the direction of axis X on axle 36, a locking recess 376 for engaging a locking ridge 380 formed intermittently in the direction of axis X on axle 36, a locking projection 384 for engaging a locking recess 388 formed intermittently in the direction of axis X on axle 36, a locking groove 392 for engaging a locking ridge 396 formed intermittently in the direction of axis X on axle 36, and a control sleeve support surface 404 for supporting a base sleeve 408 of pawl control sleeve 288 between sun gear guide ring 210 and axle 36.

Sun gear guide ring 234 is fitted between second guide ring contact surface 228 of third sun gear 168 and axle 36. As shown in FIGS. 3 and 5, in addition to outer peripheral surface 232, sun gear guide ring 234 includes a locking recess 420 for engaging locking ridge 364 formed on axle 36, a locking projection 424 for engaging locking groove 372 formed on axle 36, a locking recess 428 for engaging locking ridge 380 formed on axle 36, a locking projection 432 for engaging locking recess 388 formed on axle 36, a locking groove 436 for engaging locking ridge 396 formed on axle 36, and a control sleeve support surface 440 for supporting base sleeve 408 of pawl control sleeve 288 between sun gear guide ring 234 and axle 36.

Figure 6:
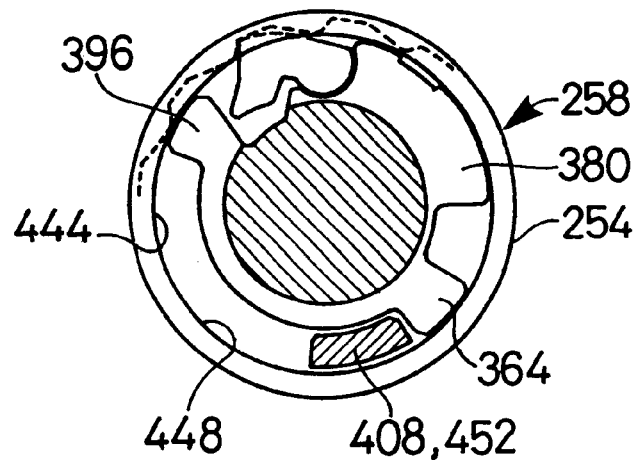
FIG. 6 is a side view showing how a sun gear guide ring used for the fourth sun gear is fitted on the axle.
Figure 7:
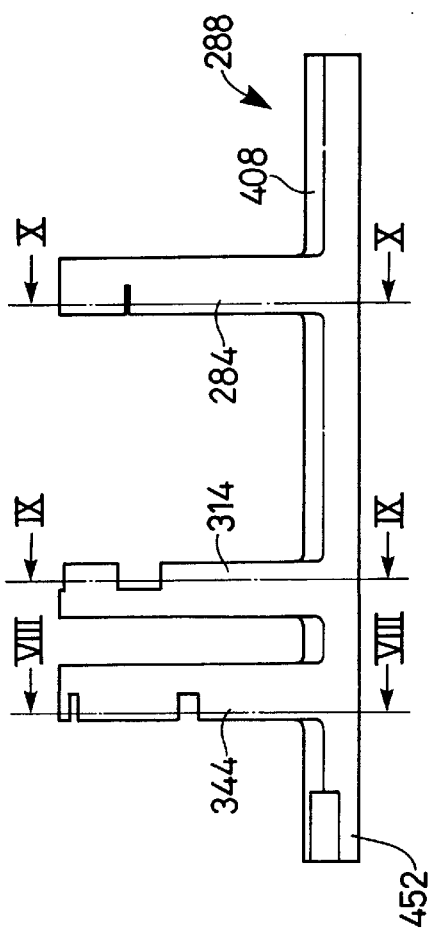
FIG. 7 is a side view of a shift control sleeve used in the hub transmission.

Sun gear guide ring 254 is fitted between guide ring contact surface 252 of fourth sun gear 172 and axle 36. As shown in FIGS. 3 and 6, unlike sun gear guide rings 210 and 234, sun gear guide ring 254 has a circular inner peripheral surface 444 that is fitted around locking ridges 364, 380 and 396 on axle 36. A portion of inner peripheral surface 444 forms a control sleeve support surface 448 for supporting an end 452 of base sleeve 408 between sun gear guide ring 258 and axle 36. End 452 of base sleeve 408 terminates in a groove 454 in a washer 456.

Figure 8:
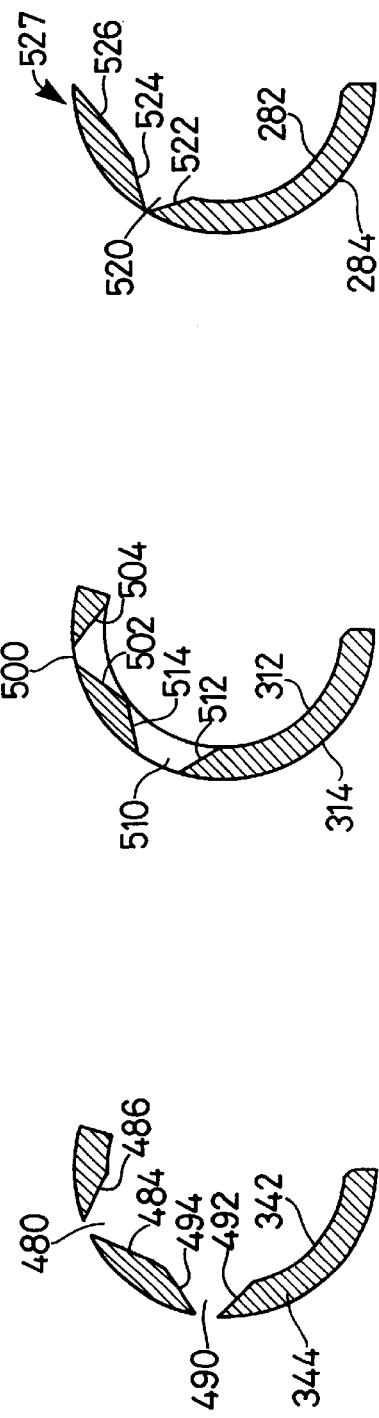
FIG. 8 is a view taken along line VIII—VIII in FIG. 7.

Base sleeve 408 of pawl control sleeve 288 is rotatably fitted withing a control sleeve groove 460 formed in the direction of axis X on axle 36 and is supported radially outwardly by sun gear guide rings 210, 234 and 258. Pawl control arms 284, 314 and 344 are slidably disposed in control arm grooves 464, 468 and 472, respectively, formed circumferentially in axle 36. As shown in FIG. 8, pawl control arm 344 includes a recess 480 having tapered side surfaces 484 and 486, and a recess 490 having tapered side surfaces 492 and 494. As noted above, inner peripheral surface 342 of pawl control arm 344 contacts pawl control surface 340 of pawl 250. Thus, since pawl 250 is biased radially outwardly by spring 332, pawl 250 is held radially inwardly and disengaged from fourth sun gear ratchet teeth 248 whenever inner peripheral surface 342 of pawl control arm 344 contacts pawl control surface 340 except when recess 480 or 490 is aligned with pawl control surface 340. In that case pawl control surface 340 rises into recess 480 or 490, and pawl tooth 346 engages one of the fourth sun gear ratchet teeth 248 to nonrotatably couple fourth sun gear 172 to axle 36. Tapered surfaces 484, 486, 492 and 494 facilitate the entry and exit of pawl control surface 340 into recesses 480 and 490 as pawl control sleeve 288 rotates around axle 36.

Figure 9:
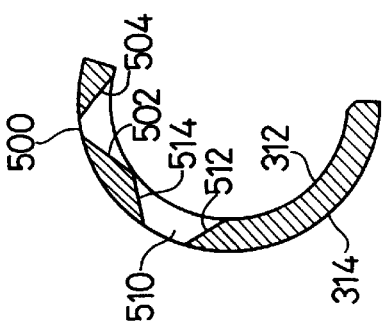
FIG. 9 is a view taken along line IX—IX in FIG. 7.

Similarly, as shown in FIG. 9, pawl control arm 314 includes a recess 500 having tapered side surfaces 502 and 504, and a recess 5 10 having tapered side surfaces 512 and 514. As noted above, inner peripheral surface 312 of pawl control arm 314 contacts pawl control surface 310 of pawl 226. Thus, since pawl 226 is biased radially outwardly by spring 302, pawl 226 is held radially inwardly and disengaged from third sun gear ratchet teeth 224 whenever inner peripheral surface 312 of pawl control arm 314 contacts pawl control surface 310 except when recess 500 or 510 is aligned with pawl control surface 310. In that case pawl control surface 310 rises into recess 500 or 510, and pawl tooth 316 engages one of the third sun gear ratchet teeth 224 to nonrotatably couple third sun gear 168 to axle 36. Tapered surfaces 502, 504, 512 and 514 facilitate the entry and exit of pawl control surface 310 into recesses 500 and 510 as pawl control sleeve 288 rotates around axle 36.

Figure 10:
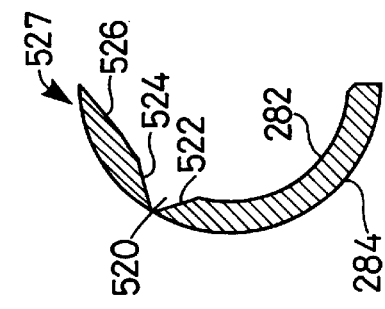
FIG. 10 is a view taken along line X—X in FIG. 7.

Finally, as shown in FIG. 10, pawl control arm 284 includes a recess 520 having tapered side surfaces 522 and 524. A tapered surface 526 also is disposed at the end 527 of pawl control arm 284. As noted above, inner peripheral surface 282 of pawl control arm 284 contacts pawl control surface 280 of pawl 207. Thus, since pawl 207 is biased radially outwardly by spring 272, pawl 207 is held radially inwardly and disengaged from second sun gear ratchet teeth 206 whenever inner peripheral surface 282 of pawl control arm 284 contacts pawl control surface 280 except when recess 520 is aligned with pawl control surface 280. In that case pawl control surface 280 rises into recess 520, and pawl tooth 289 engages one of the second sun gear ratchet teeth 206 to nonrotatably couple second sun gear 164 to axle 36. Tapered surfaces 522 and 524 facilitate the entry and exit of pawl control surface 280 into recess 520, and tapered surface 526 facilitates the entry of pawl control surface 280 beneath pawl control arm 284 as pawl control sleeve 288 rotates around axle 36.

FIGS. 11–14 illustrate the operation of pawl control sleeve 288 using second sun gear 164 as an example. In the position shown in FIG. 11, pawl control sleeve 288 is at its most counterclockwise position, pawl 207 is outside pawl control arm 284, pawl tooth 289 is engaged with second sun gear ratchet teeth 206, and second sun gear 164 is nonrotatably coupled to axle 36.

When pawl control arm 284 rotates clockwise to the position shown in FIG. 12, pawl control surface 280 slides beneath tapered surface 526 and abuts against inner peripheral surface 282 of pawl control arm 284. As a result, pawl tooth 289 is held radially inwardly and disengaged from second sun gear ratchet teeth 206. In this state second sun gear 164 is free to rotate relative to axle 36. Since base sleeve 408 of pawl control sleeve 288 is fitted between control sleeve support surface 404 of sun gear guide ring 210 and control sleeve groove 460 on axle 36, torsional and other forces applied to base sleeve 408 do not cause undesirable bending of pawl control sleeve 288.

When pawl control arm 284 rotates further clockwise to the position shown in FIG. 13, pawl control surface 280 enters recess 520, thus allowing pawl tooth 289 to move radially outwardly into engagement with one of second sun gear ratchet teeth 206, thus once again nonrotatably coupling second sun gear 164 to axle 36. Since second sun gear 164 has twelve second sun gear ratchet teeth 206 and only one pawl 207, the nonrotatable engagement between second sun gear 164 and axle 36 occurs very quickly. In prior art systems that have more than one pawl (typically mounted to the inner peripheral surface of the sun gear) and fewer ratchet teeth (typically formed on the axle), the circumferential distance of the ratchet teeth and the requirement that all of the pawls align with the ratchet teeth causes great delay in the coupling operation.

When pawl control arm 284 rotates further clockwise to the position shown in FIG. 14, pawl control surface 280 slides out of recess 520 along tapered surface 522 until pawl control surface 280 is supported radially inwardly by inner peripheral surface 282 of pawl control arm 284. As a result, pawl tooth 289 is disengaged from second sun gear ratchet teeth 206, and second sun gear 164 is free to rotate relative to axle 36.

As shown in FIG. 2, power transmitting mechanism 82 further comprises a first planet gear carrier 550, a first ring gear 551, a second planet gear carrier 552 and a second ring gear 553, all of which are rotatably mounted around axle 36. Planet gear carrier 550 includes a plurality (e.g., 12) of circumferentially disposed clutch engaging splines 554 on its right side for engaging a complementary plurality of planet gear carrier engaging splines 558 formed on a clutch ring 562, a plurality (e.g., 12) of circumferentially disposed second planet gear carrier engaging splines 564 formed on its left side for engaging complementary circumferentially disposed first planet carrier engaging splines 568 formed on the right side of second planet gear carrier 552, and a plurality of circumferentially disposed planet gear supporting pins 572, each of which rotatably supports a planet gear 576. Each planet gear 576 has a small diameter gear portion 580 (e.g., 14T) engaging the plurality of first sun gear teeth 178 on first sun gear 160, and a large diameter gear portion 584 (e.g., 22T) engaging a first inner peripheral gear portion 585 (e.g., 84T) of first ring gear 551.

In addition to the inner peripheral gear portion 585, first ring gear 551 includes a second inner peripheral gear portion 586 (e.g., 36T) for engaging a plurality of circumferentially disposed pawls 587 that are mounted on a corresponding plurality of circumferentially disposed pawl pins 588 that are fixed to driver 70. Pawls 587 are biased radially outwardly by a pawl spring 589 and thus function as a one-way clutch between driver 70 and first ring gear 551. A plurality of pawls 590 also are circumferentially disposed on pawl pins 588 for driving first ring gear 551 in the rearward direction in a well known manner.

In addition to the plurality of circumferentially disposed first planet gear carrier engaging splines 568 which nonrotatably couple second planet gear carrier 552 to the plurality of second planet gear carrier engaging splines 564 on first planet gear carrier 550, second planet gear carrier 552 includes a plurality of circumferentially disposed brake roller cage engaging splines 592 for engaging a complementary plurality of second planet carrier engaging splines 596 formed on a brake roller cage 597, and a plurality (e.g., 18) of circumferentially disposed outer peripheral cam surfaces 904 that engage a corresponding plurality of rollers 900 in coaster brake 86.

Second planet gear carrier 552 also includes a plurality of circumferentially disposed planet gear supporting pins 604, each of which rotatably supports a planet gear 608. Each planet gear 608 includes a large diameter gear portion 612 (e.g., 29T) engaging the plurality of fourth sun gear teeth 244 on fourth sun gear 172, an intermediate diameter gear portion 616 (e.g., 18T) engaging the plurality of third sun gear teeth 236 on third sun gear 168, and a small diameter gear portion 620 (e.g., 14T) engaging the plurality of second sun gear teeth 198 on second sun gear 164 as well as an inner peripheral gear portion 624 (e.g., 78T) of second ring gear 553. Second ring gear 553 is coupled to right cup 120, and hence to hub shell 74, through a one-way clutch in the form of a roller clutch 628 having, e.g., 18 rollers and cam surfaces.

Figure 15:
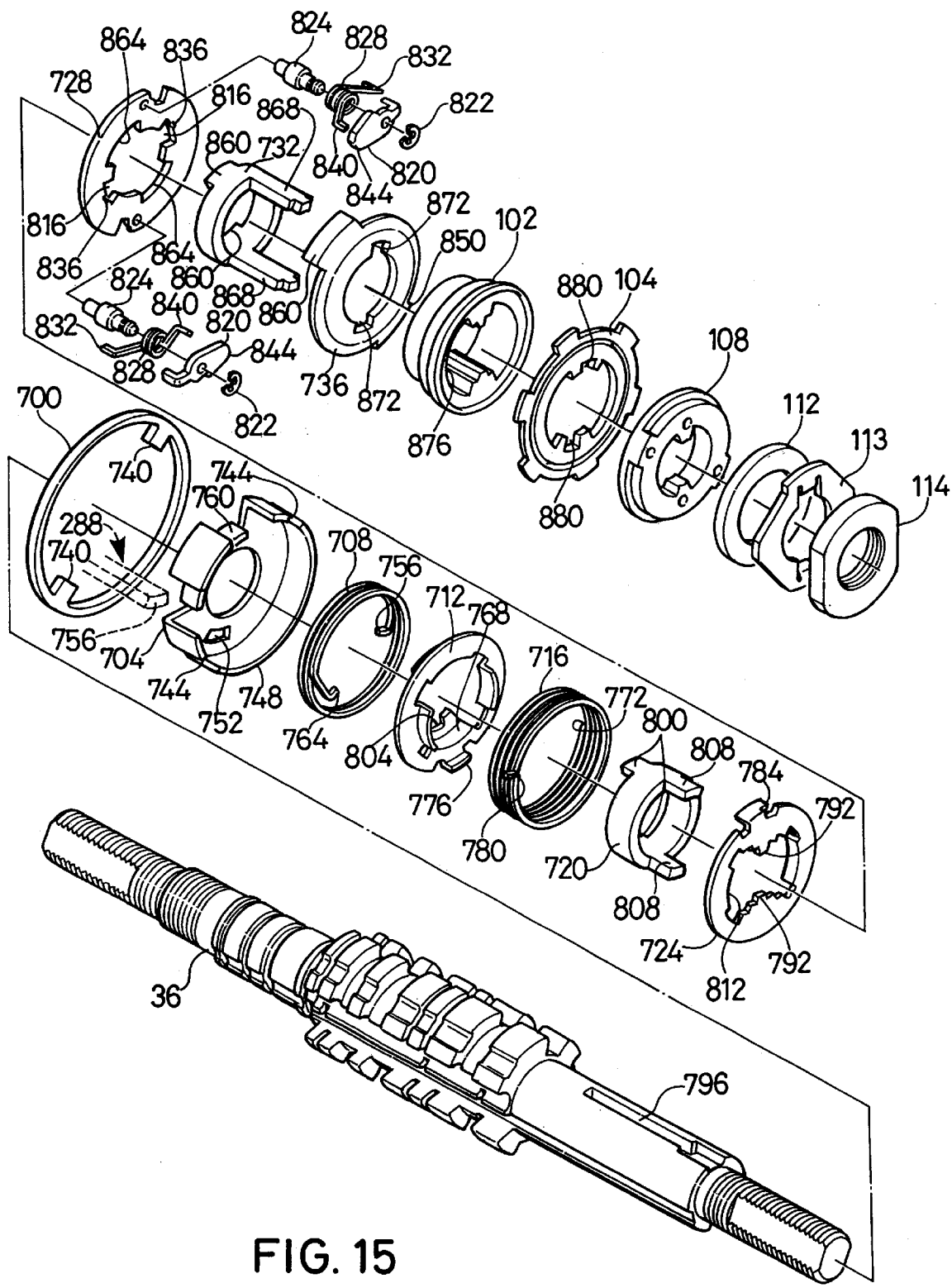
FIG. 15 is an exploded view of a shift/assist mechanism used in the hub transmission.
Figure 16:
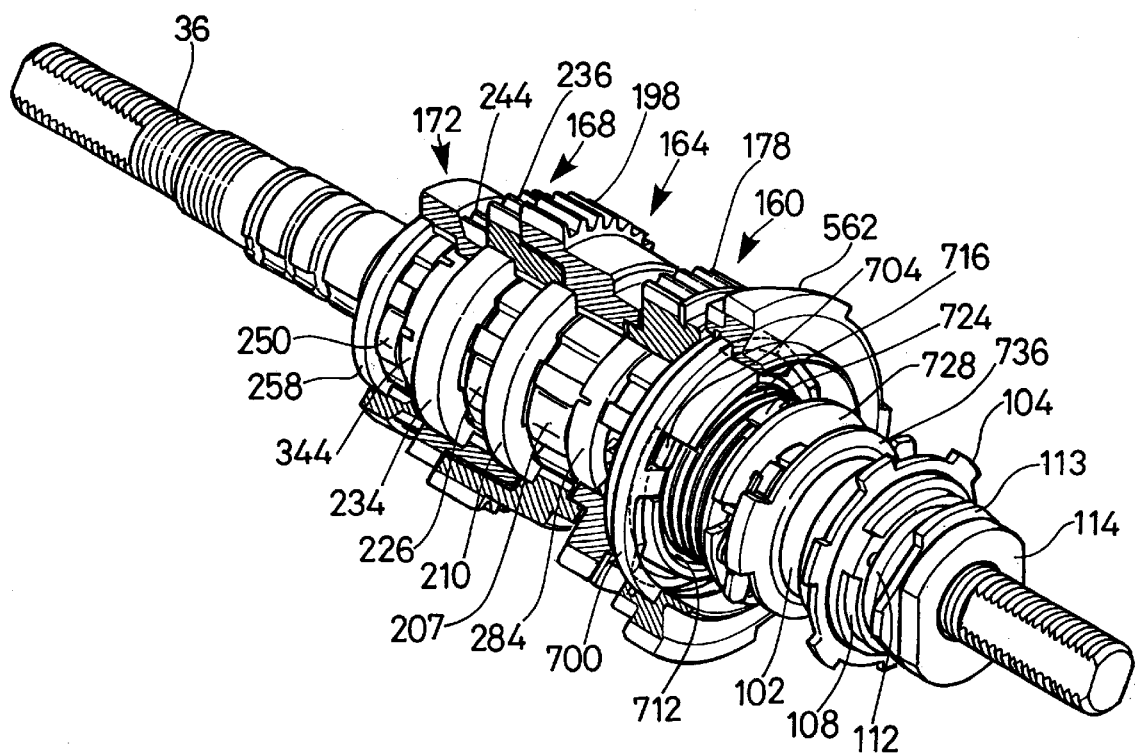
FIG. 16 is an oblique view showing the sun gear apparatus and the shift/assist mechanism in an assembled state.
Figure 17:
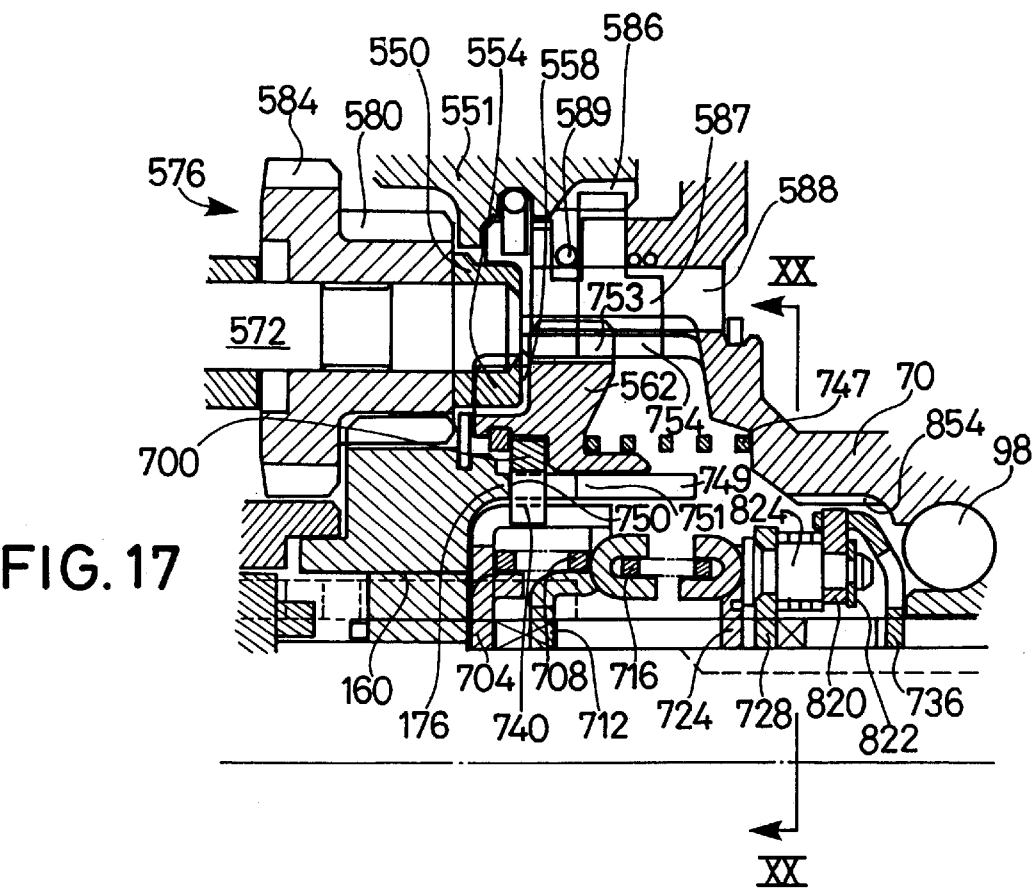
FIG. 17 is a detailed view showing the shift/assist mechanism when the driver is coupled to the planet gear carrier.
Figure 18:
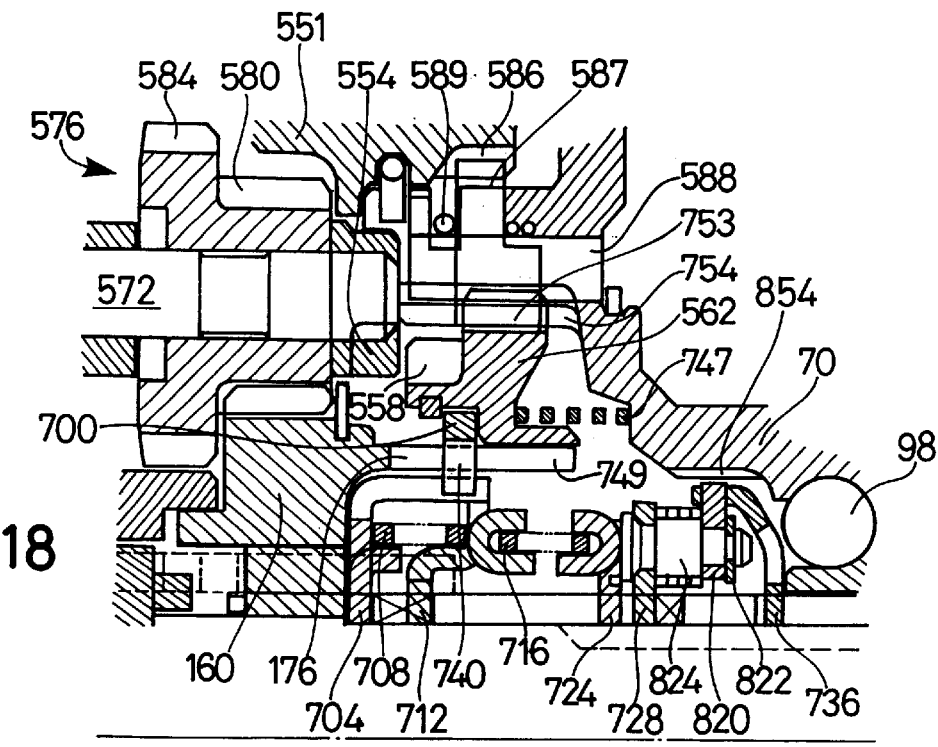
FIG. 18 is a detailed view showing the shift/assist mechanism when the driver is uncoupled from the planet gear carrier.

FIG. 15 is an exploded view of shift/assist mechanism 90, FIG. 16 is an oblique view showing shift/assist mechanism 90 assembled to axle 36, FIG. 17 is a detailed view showing shift/assist mechanism 90 when clutch ring 562 is coupled to first planet gear carrier 550, and FIG. 18 is a detailed view showing shift/assist mechanism 90 when clutch ring 562 is uncoupled from first planet gear carrier 550. As shown in those Figures, shift/assist mechanism 90 includes a ring-shaped shift key member 700, a shift key member guide 704, a saver spring 708, a spring washer 712, a return spring 716, a shift sleeve 720, a spring washer 724, a pawl support 728, a shift sleeve 732, and a pawl control washer 736. Shift key member 700 includes radially inwardly extending cam followers 740 that extend through clutch cam portion 176 of first sun gear 160 (FIG. 17) into axially extending grooves 744 formed in a side wall 748 of shift key member guide 704. As shown in FIGS. 17 and 18, clutch cam portion 176 of first sun gear 160 includes a cam surface 749 defining a first cam step 750 and a second cam step 751. Also, clutch ring 562 is biased to the left by a clutch bias spring 747. Thus, when shift key member 700 is in the position shown in FIG. 17, planet gear carrier engaging splines 558 on clutch ring 562 engage clutch engaging splines 554 on first planet gear carrier 550, and a plurality of circumferentially disposed driver engaging splines 753 on clutch ring 562 nonrotatably engage a complementary plurality of clutch engaging splines 754 on driver 70 so that driver 70, clutch ring 562 and first planet gear carrier 550 rotate as a unit. However, when shift key member 700 is rotated, cam followers 740 on shift key member 700 move to second cam step 751 on first sun gear 160 as shown in FIG. 18. In this position planet gear carrier engaging splines 558 on clutch ring 562 disengage from clutch engaging splines 554 on first planet gear carrier 550 so that planet gear carrier 550 no longer is coupled directly to driver 70.

Shift key member guide 704 also includes a shift control sleeve coupling opening 752 for coupling to an end 756 of shift control sleeve 288. Saver spring 708 and spring washer 712 both are disposed radially inwardly within side wall 748 of shift key member guide 704, wherein a first end 756 of saver spring 708 is retained to an axially extending spring ledge 760 formed on shift key member guide 704, and a second end 764 of saver spring 708 is retained to a side edge of a sleeve coupling ledge 768 formed on spring washer 712.

A first end 772 of return spring 716 is retained to a spring ledge 776 formed on spring washer 712, and a second end 780 of return spring 716 is retained to a spring ledge 784 on spring washer 724. Spring washer 724 includes radially inwardly extending and diametrically opposed axle engaging projections 792 that are fitted within diametrically opposed axle grooves 796 formed in axle 36 (only one such groove 796 is shown in FIG. 15) so that spring washer 724 is nonrotatably coupled to axle 36. As a result of the nonrotatable coupling of spring washer 724 on axle 36, return spring 716 biases spring washer 712 clockwise relative to spring washer 724.

Diametrically opposed left side coupling legs 800 on shift sleeve 720 nonrotatably engage complementary recesses 804 in sleeve coupling ledges 768 on spring washer 712 (only one such sleeve coupling ledge 768 is shown in FIG. 15), and diametrically opposed right side coupling legs 808 on shift sleeve 720 extend through central opening 812 in spring washer 724 and nonrotatably engage complementary shift sleeve coupling recesses 816 in pawl support 728. Thus, spring washer 712, shift sleeve 720 and pawl support 728 rotate as a unit.

Diametrically opposed pawls 820 are rotatably mounted through C-clips 822 to pawl support pins 824 which, in turn, are mounted to spring washer 728. Pawl bias springs 828 each having one end 832 engaging a spring retaining ledge 836 on pawl support 728 and another end 840 engaging its respective pawl 820 to bias pawl ends 844 radially outwardly. Pawl control washer 736 includes diametrically opposed and axially extending pawl control ledges 850 that ordinarily press pawls 820 radially inwardly. When pawl control ledges 850 move away from pawls 820 as described in more detail below, pawls 820 swing radially outwardly and engage with shift assist teeth 854 (FIG. 17) formed on the inner peripheral surface of driver 70.

Figure 19:
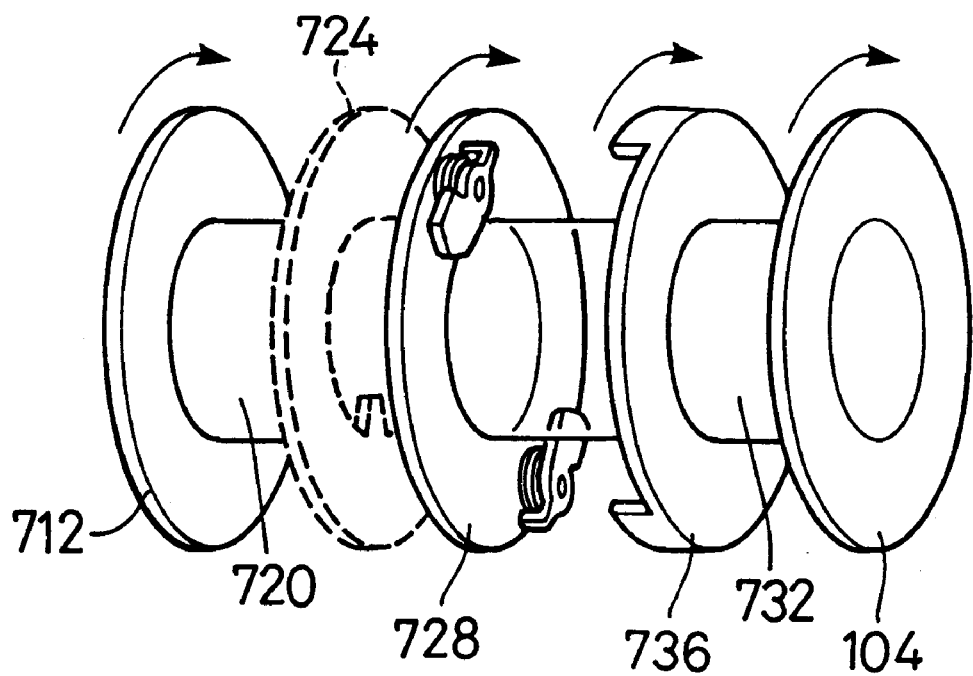
FIG. 19 is a schematic view illustrating the biasing of the shift/assist mechanism.
Figure 20:
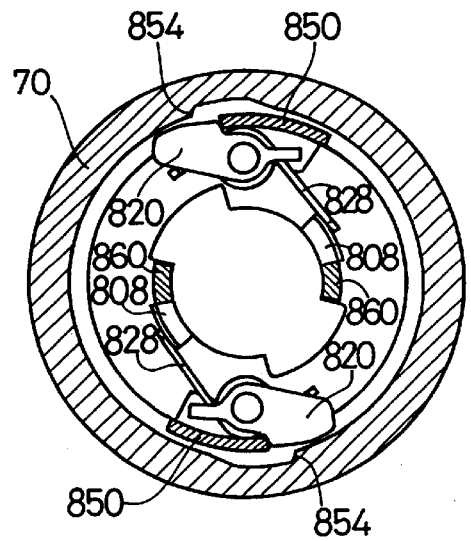
FIG. 20 is a view taken along line XX—XX in FIG. 17 showing the shift/assist mechanism in an inoperative state.

Diametrically opposed left side coupling legs 860 on shift sleeve 732 contact the diametrically opposed right side coupling legs 808 on shift sleeve 720 (as shown in FIG. 20), and diametrically opposed right side coupling legs 868 on shift sleeve 732 nonrotatably extend through coupling recesses 872 in pawl control washer 736 and though opening 876 in bearing cone 102 and nonrotatably engage complementary shift sleeve coupling recesses 880 in actuator plate 104. Thus, shift sleeve 732, pawl control washer 736 and actuator plate 104 rotate as a unit. However, shift sleeve 732 can rotate clockwise relative to shift sleeve 720 and pawl support 728 as discussed more fully below. Since return spring 716 biases spring washer 712 clockwise relative to spring washer 724, since spring washer 712 is coupled to pawl support 728 through shift sleeve 720, and since pawl support 728 is coupled to actuator plate 104 through shift sleeve 732, actuator plate 104 also has a net clockwise bias as shown schematically in FIG. 19. Given the initial clockwise start position of actuator plate 104, the transmission paths in power transmitting mechanism 82 are subsequently selected by rotating actuator plate 104 counterclockwise.

The coupling of the various components for each speed stage is shown in Table 1, and the power transmission path for each speed stage is shown in Table 2:

TABLE 1

| Speed Stage | Clutch Ring 562 | Sun Gear 164 | Sun Gear 168 | Sun Gear 172 | Gear Ratio |
|---|---|---|---|---|---|
| 1 (Low) | Disengaged | Free | Free | Free | 0.53 |
| 2 | Disengaged | Free | Free | Locked | 0.64 |
| 3 | Disengaged | Free | Locked | Free | 0.74 |
| 4 | Disengaged | Locked | Locked | Free | 0.85 |
| 5 | Engaged | Free | Free | Free | 1.0 |
| 6 | Engaged | Free | Free | Locked | 1.22 |
| 7 | Engaged | Free | Locked | Free | 1.42 |
| 8 (High) | Engaged | Locked | Free | Free | 1.62 |

TABLE 2

| Speed Stage | Power Transmission Path |
|---|---|
| 1 | Driver 70→Pawl 587→First Ring Gear 551→First Planet Gear Carrier 550 (planet gear 576 rotates around first sun gear 160)→Second Planet Gear Carrier 552→Pawl 908→Hub Shell 74 |
| 2 | Driver 70→Pawl 587→First Ring Gear 551→First Planet Gear Carrier 550 (planet gear 576 rotates around first sun gear 160)→Second Planet Gear Carrier 552 (planet gear 608 rotates around fourth sun gear 172)→Second Ring Gear 553→Roller Clutch 628→Hub Shell 74 |
| 3 | Driver 70→Pawl 587→First Ring Gear 551→First Planet Gear Carrier 550 (planet gear 576 rotates around first sun gear 160)→Second Planet Gear Carrier 552 (planet gear 608 rotates around third sun gear 168)→Second Ring Gear 553→Roller Clutch 628→Hub Shell 74 |
| 4 | Driver 70→Pawl 587→First Ring Gear 551→First Planet Gear Carrier 550 (planet gear 576 rotates around first sun gear 160)→Second Planet Gear Carrier 552 (planet gear 608 rotates around second sun gear 164)→Second Ring Gear 553→Roller Clutch 628→Hub Shell 74 |
| 5 | Driver 70→Clutch Ring 562→First Planet Gear Carrier 550→Second Planet Gear Carrier 552→Pawl 908→Hub Shell 74 |
| 6 | Driver 70→Clutch Ring 562→First Planet Gear Carrier 550→Second Planet Gear Carrier 552 (planet Gear 608 rotates around fourth sun gear 172)→Second Ring Gear 553→Roller Clutch 628→Hub Shell 74 |
| 7 | Driver 70→Clutch Ring 562→First Planet Gear Carrier 550→Second Planet Gear Carrier 552 (planet gear 608 rotates around third sun gear 168)→Second Ring Gear 553→Roller Clutch 628→Hub Shell 74 |
| 8 | Driver 70→Clutch Ring 562→First Planet Gear Carrier 550→Second Planet Gear Carrier 552 (planet Gear 608 rotates around second sun gear 164)→Second Ring Gear 553→Roller Clutch 628→Hub Shell 74 |

When shifting from speed stage 4 to speed stage 5, such as when the bicycle is accelerating, the timing of the coupling mechanisms are set to follow the following sequence:

| Speed Stage | Clutch Ring 562 | Sun Gear 164 | Sun Gear 168 | Sun Gear 172 |
|---|---|---|---|---|
| 4 | Disengaged | Locked | Locked | Free |
| (same as 3) | Disengaged | Free | Locked | Free |
| (same as 7) | Engaged | Free | Locked | Free |
| 5 | Engaged | Free | Free | Free |

Thus, when the bicycle is accelerating and the cyclist shifts from speed stage 4 to speed stage 5, the second sun gear 164 is released first to create the same state as speed stage 3. The rider would perceive this as a slight acceleration of the pedals, but that is expected when the bicycle is accelerating. Then, clutch ring 562 is engaged with first planet gear carrier 550 to create the same state as speed stage 7. The rider would perceive this as a deceleration of the pedals, which is expected when the transmission shifts to a higher gear ratio. Thereafter, third sun gear 168 is released to produce the desired speed stage 4. If the sun gears were released before clutch ring 562 were engaged, then the transmission would be in the same state as speed stage 1, which would produce very undesirable rapid acceleration of the pedals and a significant shock when the transmission completes the shift to speed stage 5.

This sequence also has particular benefit when the bicycle is decelerating and the rider wishes to shift from speed stage 5 to speed stage 4. In this case, the temporary transition from speed stage 5 to speed stage 7 causes a deceleration of the pedals, but that is far preferable than if clutch ring 562 were disengaged first. If clutch ring 562 were disengaged first, then the transmission would be in the same state as speed stage 1, with rapid acceleration of the pedals. Such rapid acceleration of the pedals is undesirable when climbing a hill, for example. Thereafter, the transmission makes a temporary transition from speed stage 7 to speed stage 3. This produces an acceleration of the pedals, but since speed stage 3 is adjacent to speed stage 4 which the cyclist was just in, the transition is much more acceptable. Thereafter, the transmission makes the transition to the desired speed stage 4. The overall shift from speed stage 5 to speed stage 4 thus avoids excessive acceleration or deceleration of the pedals under conditions when such rapid acceleration or deceleration is least desired.

As noted previously, hub transmission 14 also includes a coaster brake 86 for stopping the rotation of hub shell 74 relative to axle 36 when sprocket 54 (and hence driver 70) is rotated in a rearward direction. As shown in FIG. 2, coaster brake 86 includes left cup 124 that is nonrotatably supported to hub shell 74 and defines a circumferentially disposed braking surface 890, a plurality of circumferentially disposed arcuate brake shoes 894 biased radially inwardly from braking surface 890 by a brake spring 898, roller cage 597 supporting the plurality of circumferentially disposed rollers 900, and the plurality of cam surfaces 904 disposed circumferentially on the outer peripheral surface of second planet gear carrier 552. A plurality of circumferentially disposed pawls 908 are mounted to roller cage 597 and are biased radially outwardly by pawl springs 912 for engaging an inner peripheral gear 916 formed on the right side of left cup 124. Pawls 908 communicate forward rotation of second planet gear carrier 552 to left cup 124 and hence to hub shell 74.

Coaster brake 86 is operated by rotating sprocket 54 in reverse. Planet gear carrier splines 558 on clutch ring 562 and clutch engaging splines 554 on first planet gear carrier 550 are tapered such that, when clutch ring 562 is engaged with first planet gear carrier 550 and sprocket 54 is rotated in reverse to activate coaster brake 86, clutch ring 562 disengages from first planet gear carrier 550. Thus, regardless of what speed stage hub transmission 14 is in at the time, the rotational power of driver 70 is communicated along the following path: Driver 70→Pawls 590→First Ring Gear 551→First Planet Gear Carrier 550→Second Planet Gear Carrier 552→Brake Roller 900→Brake Shoe 898→Braking Surface 890→Hub Shell 74. This path produces 1.3 times more braking power than when the transmission path goes through clutch ring 562.

Figure 21:
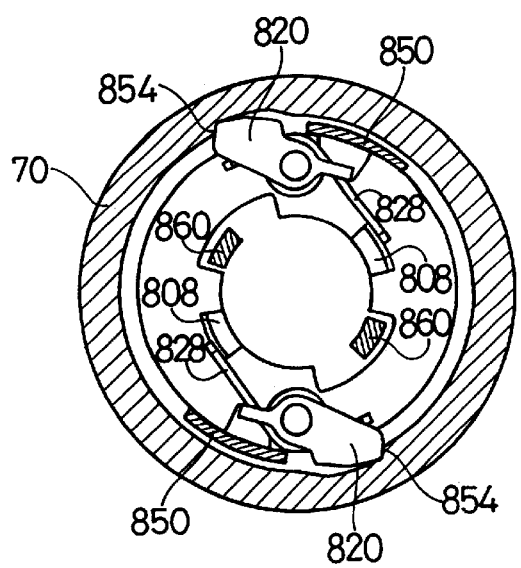
FIG. 21 is a view taken along line XX—XX in FIG. 17 showing the shift/assist mechanism in an operative state.
Figure 22:
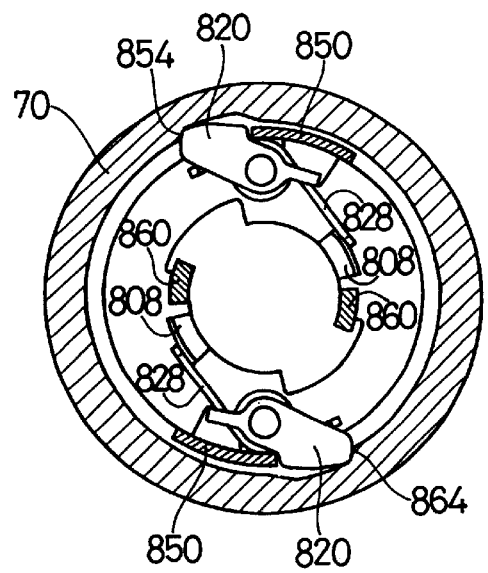
FIG. 22 is a view taken along line XX—XX in FIG. 17 showing the shift/assist mechanism moving back toward the inoperative state.

As noted previously, shift/assist mechanism 90 also uses the rotational power of driver 70 to help change the power transmission paths in power transmitting mechanism 82. This is desirable when significant drive force is applied to sprocket 54 and causes great resistance to the coupling or uncoupling of the various components. During normal operation, actuator plate 104, shift sleeve 732, pawl control washer 736, pawl support 728, shift sleeve 720, spring washer 712, shift key member guide 704 and shift control sleeve 288 rotate as a unit to couple and uncouple the various components. As a result, the positions of shift sleeve 732, pawl control washer 736, pawls 820 and shift sleeve 720 are as shown in FIG. 20. In this state pawls 820 are disengaged from shift assist teeth 854 on driver 70. However, when significant drive force is applied to sprocket 54 and causes significant resistance to the operation of shift control sleeve 288, shift control sleeve 288 tends to remain stationary despite rotation of actuator plate 104. In this case shift sleeve 732 rotates relative to shift sleeve 720, thus causing pawl control washer 736 to rotate relative to pawl support 728 so that pawl control ledges 850 move away from pawls 820 as shown in FIG. 21. As a result, pawls 820 rotate radially outwardly and engage shift assist teeth 854 on driver 70 so that pawl support 728 rotates together with driver 70. This, in turn, provides an assisting force to rotate shift sleeve 720, shift key member guide 704 and shift control sleeve 288 to complete the shifting operation. When the resistance from shift control sleeve 288 is overcome, pawl support 728 rotates clockwise relative to pawl control washer 736 as shown in FIG. 22 until the shift operation is complete and the state resumes to that shown in FIG. 20.

Figure 23:
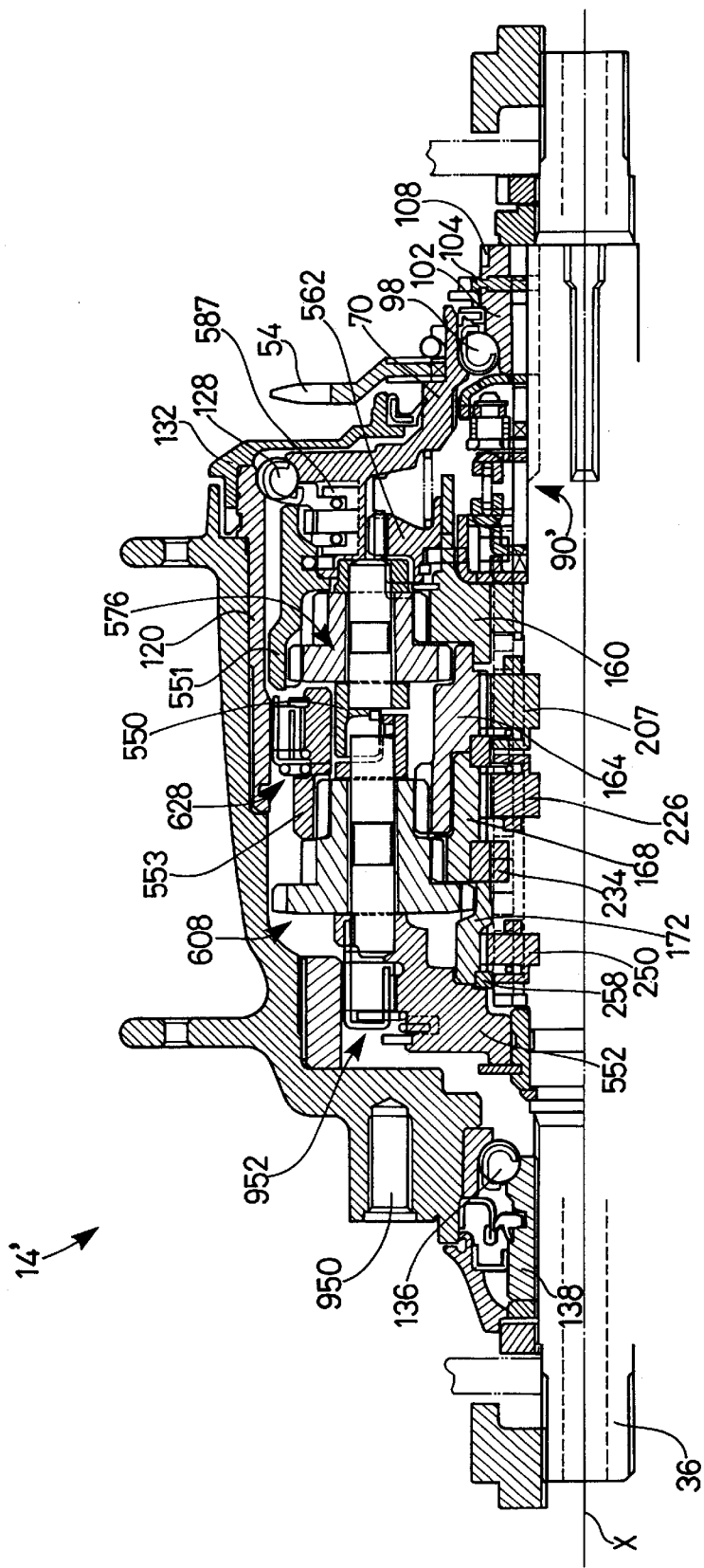
FIG. 23 is a cross-sectional view of an alternative embodiment of a hub transmission according to the present invention.
Figure 24:
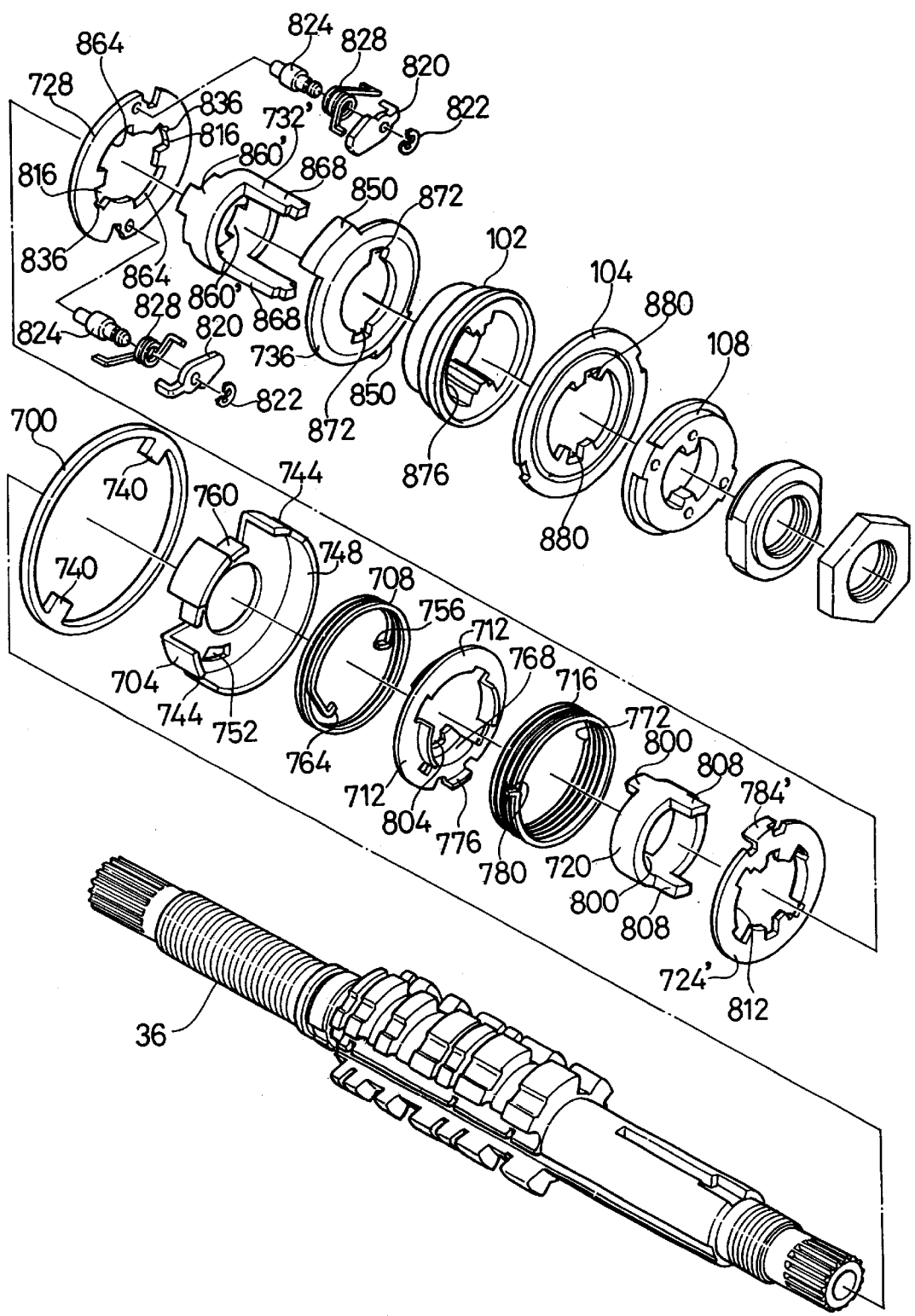
FIG. 24 is an exploded view of the shift/assist mechanism used in the hub transmission shown in FIG. 23.
Figure 25:
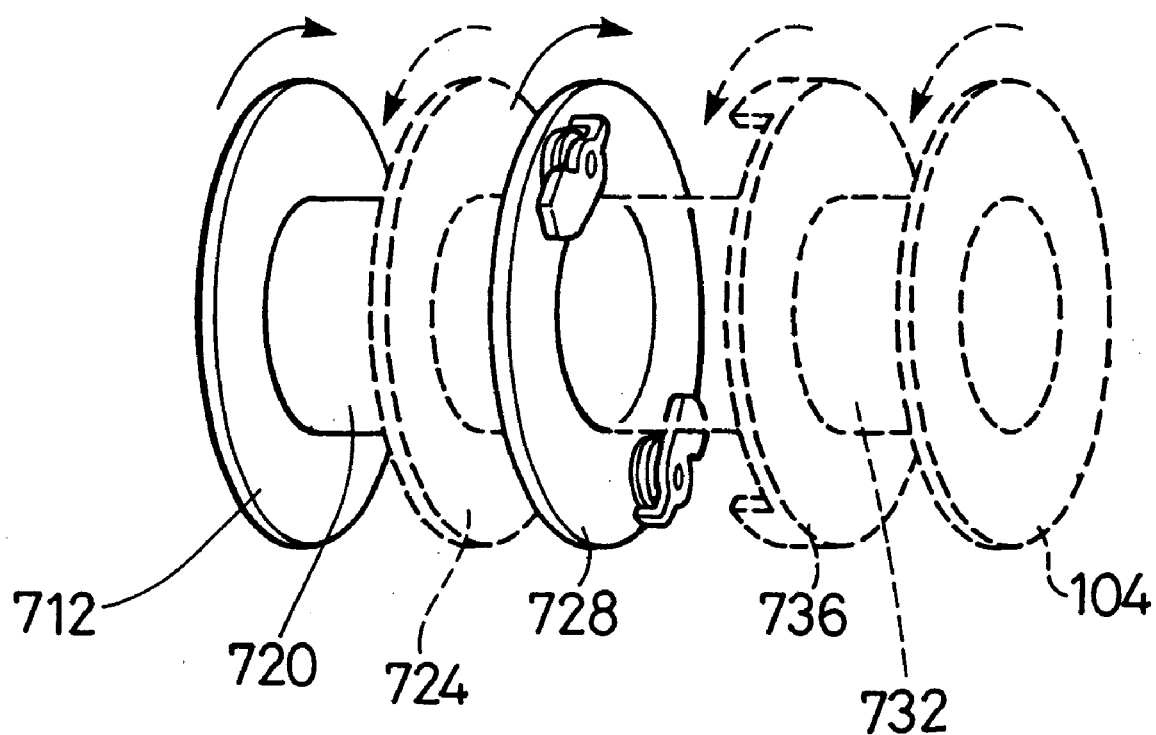
FIG. 25 is a schematic view illustrating the biasing of the shift/assist mechanism.

FIG. 23 is a cross-sectional view of a hub transmission 14' which represents an alternative embodiment of the present invention. Hub transmission 14' is constructed substantially the same as hub transmission 14, so the identical components are numbered the same. This embodiment differs in that coaster brake 86 and pawls 590 are omitted (a brake disk rotor is mounted to hub shell 74 at mounting holes 950), a roller clutch 952 is substituted for pawls 908, and the structure of a shift/assist mechanism 90' is slightly different from shift/assist mechanism 90 in the first embodiment. FIG. 24 is an exploded view of the relevant portions of shift/assist mechanism 90'. In this embodiment, a spring washer 724' is rotatably mounted around axle 36, and left side legs 860' of shift sleeve 732' engage spring washer 724'. As a result, spring 716 causes pawl support 728 and pawl control washer 736 to be biased in opposite directions relative to each other to provide the assist function as shown in FIG. 25, but pawl control ledges 850 abut against pawls 820 to prevent further rotation of pawl control washer 736 relative to pawl support 728. As a result, there is no net return spring biasing force applied to actuator plate 104. This structure is useful when actuator plate 104 is rotated by a battery-powered motor, for the unbiased actuator plate 104 does not create significant power drain on the batteries during operation of the motor.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A sun gear apparatus comprising:

an axle;

a first sun gear rotatably supported around the axle; and a first sun gear guide ring nonrotatably fixed to the axle between an inner peripheral surface of the first sun gear and the axle, wherein the first sun gear guide ring is unshiftable in an axial direction, wherein the first sun gear guide ring includes at least one of a locking projection and a locking groove that engages a corresponding at least one of a locking groove and locking projection disposed on the axle to nonrotatably fix the first sun gear guide ring to the axle, wherein the first sun gear guide ring does not form a part of another sun gear.

2. The apparatus according to claim 1 wherein the first sun gear rotates relative to the first sun gear guide ring.

3. The apparatus according to claim 1 further comprising a second sun gear rotatably supported around the axle, wherein the first sun gear guide ring is disposed between an inner peripheral surface of the second sun gear and the axle.

4. The apparatus according to claim 1 further comprising a second sun gear guide ring disposed between the inner peripheral surface of the first sun gear and the axle.

5. The apparatus according to claim 1 further comprising a pawl disposed between the inner peripheral surface of the first sun gear and the axle for moving between an engaged position, wherein the first sun gear is nonrotatably coupled to the axle, and a disengaged position wherein the first sun gear rotates relative to the axle.

6. The apparatus according to claim 5 wherein there is only one pawl disposed between the inner peripheral surface of the first sun gear and the axle.

7. The apparatus according to claim 5 wherein the pawl is retained to the axle.

8. The apparatus according to claim 7 further comprising a plurality of ratchet teeth disposed at the inner peripheral surface of the first sun gear.

9. The apparatus according to claim 8 wherein there is more than ten of the plurality of ratchet teeth.

10. The apparatus according to claim 9 wherein there is only one pawl disposed between the inner peripheral surface of the first sun gear and the axle.

11. The apparatus according to claim 10 wherein there is exactly 12 ratchet teeth.

12. The apparatus according to claim 1 wherein the first sun gear guide ring supports the first sun gear so that the first sun gear rotates relative to the first sun gear guide ring.

13. A sun gear apparatus comprising:

an axle;

a first sun gear rotatably supported around the axle;

a first sun gear guide ring nonrotatably fixed to the axle between an inner peripheral surface of the first sun gear and the axle, wherein the first sun gear guide ring is unshiftable in an axial direction;

a second sun gear rotatably supported around the axle;

wherein the first sun gear guide ring is disposed between an inner peripheral surface of the second sun gear and the axle; and wherein the first sun gear is separate from the second sun gear.

14. The apparatus according to claim 13 wherein the first sun gear is disposed adjacent to the second sun gear.

15. The apparatus according to claim 14 wherein the first sun gear contacts the second sun gear.

16. The apparatus according to claim 13 wherein the first sun gear guide ring supports the first sun gear so that the first sun gear rotates relative to the first sun gear guide ring.

17. A sun gear apparatus comprising:

an axle;

a first sun gear rotatably supported around the axle;

a first sun gear guide ring nonrotatably fixed to the axle between an inner peripheral surface of the first sun gear and the axle;

a second sun gear guide ring disposed between the inner peripheral surface of the first sun gear and the axle; and a second sun gear rotatably supported around the axle, wherein the first sun gear guide ring is disposed between an inner peripheral surface of the second sun gear and the axle.

18. The apparatus according to claim 17 wherein the first sun gear rotates relative to the first sun gear guide ring, wherein the first sun gear rotates relative to the second sun gear guide ring, and wherein the second sun gear rotates relative to the first sun gear guide ring.

19. The apparatus according to claim 17 wherein the first sun gear is separate from the second sun gear.

20. The apparatus according to claim 19 wherein the first sun gear is disposed adjacent to the second sun gear.

21. The apparatus according to claim 20 wherein the first sun gear contacts the second sun gear.

22. A sun gear apparatus comprising:

an axle;

a first sun gear rotatably supported around the axle;

a first sun gear guide ring disposed between an inner peripheral surface of the first sun gear and the axle, wherein the first sun gear guide ring does not form a part of another sun gear;

a pawl disposed between the inner peripheral surface of the first sun gear and the axle for moving between an engaged position, wherein the first sun gear is nonrotatably coupled to the axle, and a disengaged position wherein the first sun gear rotates relative to the axle; and a pawl control member for moving the pawl between the engaged position and the disengaged position.

23. The apparatus according to claim 22 wherein the pawl control member is disposed between the first sun gear guide ring and the axle.

24. The apparatus according to claim 23 wherein the pawl control member is mounted for rotation around the axle.

25. A bicycle hub transmission comprising:

a hub axle;

a driver rotatably supported to the hub axle;

a hub shell rotatably supported to the hub axle;

a power transmitting mechanism disposed between the driver and the hub shell for communicating rotational power from the driver to the hub shell through a plurality of power transmission paths;

wherein the power transmitting mechanism comprises a planet gear mechanism including:

a first sun gear rotatably supported around the hub axle;

a first sun gear guide ring nonrotatably fixed to the axle between an inner peripheral surface of the first sun gear and the hub axle;

a ring gear rotatably supported around the hub axle;

a planet gear carrier rotatably supported around the hub axle; and a plurality of planet gears rotatably supported tot he planet gear carrier and meshing with the sun gear and the ring gear.

26. The apparatus according to claim 25 further comprising a pawl disposed between the inner peripheral surface of the first sun gear and the hub axle for moving between an engaged position, wherein the first sun gear is nonrotatably coupled to the hub axle, and a disengaged position wherein the first sun gear rotates relative to the hub axle.

27. The apparatus according to claim 26 wherein is only one pawl disposed between the inner peripheral surface of the first sun gear and the axle.

28. The apparatus according to claim 26 further comprising a plurality of ratchet teeth disposed at the inner peripheral surface of the first sun gear.

29. The apparatus according to claim 28 wherein there is more than ten of the plurality of ratchet teeth.

30. The apparatus according to claim 29 wherein there is exactly 12 ratchet teeth.

31. The apparatus according to claim 30 further comprising a roller clutch disposed between the ring gear and the hub shell.

32. A bicycle hub transmission comprising:

a hub axle;

a driver rotatably supported to the hub axle;

a hub shell rotatably supported to the hub axle;

a power transmitting mechanism disposed between the driver and the hub shell for communicating rotational power from the driver to the hub shell through a plurality of power transmission paths;

wherein the power transmitting mechanism comprises a planet gear mechanism including:

a first sun gear rotatably supported around the hub axle;

a first sun gear guide ring disposed between an inner peripheral surface of the first sun gear and the hub axle;

a pawl disposed between the inner peripheral surface of the first sun gear and the hub axle for moving between an engaged position, wherein the first sun gear is nonrotatably coupled to the hub axle, and a disengaged position wherein the first sun gear rotates relative to the hub axle;

a pawl control member for moving the pawl between the engaged position and the disengaged position;

a ring gear rotatably supported around the hub axle;

a planet gear carrier rotatably supported around the hub axle; and a plurality of planet gears rotatably supported to the planet gear carrier and meshing with the sun gear and the ring gear.

33. The apparatus according to claim 32 wherein the pawl control member is disposed between the first sun gear guide ring and the hub axle.

34. The apparatus according to claim 33 wherein the pawl control member is mounted for rotation around the hub axle.

35. A sun gear apparatus comprising:

an axle;

a first sun gear rotatably supported around the axle;

a first sun gear guide ring disposed between an inner peripheral surface of the first sun gear and the axle, wherein the first sun gear guide ring supports the first sun gear so that the first sun gear rotates relative to the first sun gear guide ring;

wherein the first sun gear guide ring includes at least one of a locking projection and a locking groove that engages a corresponding at least one of a locking groove and locking projection disposed on the axle to nontotatably fix the first sun gear guide ring to the axle;

wherein the first sun gear guide ring is continuous around its entire circumference; and wherein the first sun gear guide ring does not extend axially completely through the first sun gear, and wherein the first sun gear guide ring does not form a part of the sun gear.

36. The apparatus according to claim 35 wherein the first sun gear guide ring is unshiftable in an axial direction.

37. A sun gear apparatus comprising:

an axle;

a first sun gear rotatably supported around the axle;

a second sun gear rotatably supported around the axle;

wherein the first sun gear is separate from the second sun gear;

a first sun gear guide ring, wherein the first sun gear guide ring supports the first sun gear so that the first sun gear rotates relative to the first sun gear guide ring;

wherein the first sun gear guide ring includes at least one of a locking projection and a locking groove that engages a corresponding at least one of a locking groove and locking projection disposed on the axle to nontotatably fix the first sun gear guide ring to the axle;

wherein the first sun gear guide ring is disposed between an inner peripheral surface of the first sun gear and the axle;

wherein the first sun gear guide ring is disposed between an inner peripheral surface of the second sun gear and the axle; and wherein the first sun gear guide ring does not extend axially completely through the first sun gear.

38. The apparatus according to claim 37 wherein the first sun gear guide ring is unshiftable in an axial direction.

* * * * *